US010681427B2

(12) United States Patent
Wickramasuriya et al.

(10) Patent No.: US 10,681,427 B2
(45) Date of Patent: Jun. 9, 2020

(54) SENTIMENT MAPPING IN A MEDIA CONTENT ITEM

(75) Inventors: Jehan Wickramasuriya, St. Charles, IL (US); Venugopal Vasudevan, Palatine, IL (US); Chao Xu, Schaumburg, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 948 days.

(21) Appl. No.: 13/419,597

(22) Filed: Mar. 14, 2012

(65) Prior Publication Data
US 2013/0246168 A1 Sep. 19, 2013

(51) Int. Cl.
| G06Q 30/00 | (2012.01) |
| H04N 21/81 | (2011.01) |
| H04N 21/84 | (2011.01) |
| H04N 21/845 | (2011.01) |
| G06Q 30/02 | (2012.01) |

(52) U.S. Cl.
CPC ........... *H04N 21/812* (2013.01); *G06Q 30/02* (2013.01); *H04N 21/84* (2013.01); *H04N 21/8456* (2013.01)

(58) Field of Classification Search
CPC ........... G06Q 30/0277; G06Q 30/0241; G06Q 30/0275; G06Q 30/0273; G06Q 30/0251
See application file for complete search history.

(56) References Cited

U.S. PATENT DOCUMENTS

| 6,002,831 A | 12/1999 | Tada et al. |
| 7,546,532 B1 | 6/2009 | Nichols et al. |
| 7,788,131 B2 | 8/2010 | Nong et al. |
| 7,889,073 B2 | 2/2011 | Zalewski |
| 7,953,254 B2 | 5/2011 | Seo |
| 7,979,877 B2 | 7/2011 | Huber et al. |
| 8,090,613 B2 | 1/2012 | Kalb et al. |

(Continued)

FOREIGN PATENT DOCUMENTS

WO 2011009101 A1 1/2011

OTHER PUBLICATIONS

Hal, Metadata for Video, Nov. 26, 2011, www.videouniversity.com (Year: 2011).*

(Continued)

*Primary Examiner* — Naresh Vig
(74) *Attorney, Agent, or Firm* — Chernoff, Villhauer, McClung & Stenzel, LLP

(57) ABSTRACT

A media content item is evaluated for its "sentiment states." That is, segments of the content item are determined to be, for example, "happy," "exciting," "sad," "funny," and the like. A "sentiment map" is created that delimits segments of the content item and contains the sentiment-state keywords associated with the segments. Some maps include an amplitude for each assigned sentiment keyword and a confidence value for the segment delimitation and for each keyword. As an exemplary use of the sentiment map, an advertisement broker matches the sentiments of his advertisement offerings with segments of a content item in order to place appropriate advertisements at times when they would be most favorably received. In another example, a recommender system recommends to a user a content item whose sentiment map compares favorably to that of a content item already enjoyed by the user.

15 Claims, 5 Drawing Sheets

(56) References Cited

U.S. PATENT DOCUMENTS

| | | | |
|---|---|---|---|
| 2001/0047297 A1* | 11/2001 | Wen | G06Q 30/02 |
| | | | 705/14.55 |
| 2005/0010562 A1 | 1/2005 | Nagasaka | |
| 2006/0200342 A1 | 9/2006 | Corston-Oliver et al. | |
| 2006/0212897 A1 | 9/2006 | Li et al. | |
| 2007/0050389 A1* | 3/2007 | Kim | G06Q 30/02 |
| 2007/0157228 A1* | 7/2007 | Bayer | G06Q 30/02 |
| | | | 725/34 |
| 2008/0262912 A1 | 10/2008 | Gargi | |
| 2009/0070683 A1 | 3/2009 | Ward et al. | |
| 2009/0132326 A1* | 5/2009 | Alkove | G06Q 30/0264 |
| | | | 705/1.1 |
| 2009/0217319 A1 | 8/2009 | Weiss | |
| 2009/0222346 A1* | 9/2009 | Greene | G06Q 10/04 |
| | | | 705/14.53 |
| 2010/0023405 A1 | 1/2010 | Liu | |
| 2010/0042403 A1* | 2/2010 | Chandrasekar | G06F 17/27 |
| | | | 704/9 |
| 2010/0042421 A1 | 2/2010 | Bai et al. | |
| 2010/0161580 A1* | 6/2010 | Chipman | G06F 17/3053 |
| | | | 707/706 |
| 2010/0169326 A1 | 7/2010 | Ma et al. | |
| 2010/0217671 A1 | 8/2010 | Lee et al. | |
| 2010/0262454 A1 | 10/2010 | Sommer et al. | |
| 2011/0035277 A1 | 2/2011 | Kodialam et al. | |
| 2011/0078723 A1 | 3/2011 | Stettner et al. | |
| 2011/0131485 A1 | 6/2011 | Bao et al. | |
| 2011/0197220 A1 | 8/2011 | Rowe et al. | |
| 2012/0101808 A1 | 4/2012 | Duong-Van | |
| 2012/0143693 A1 | 6/2012 | Chung et al. | |
| 2013/0066716 A1* | 3/2013 | Chen | G06Q 30/00 |
| | | | 705/14.49 |
| 2013/0173264 A1* | 7/2013 | Kiss | G10L 25/63 |
| | | | 704/231 |
| 2013/0243392 A1 | 9/2013 | Vasudevan et al. | |
| 2013/0246447 A1 | 9/2013 | Wickramasuriya et al. | |

OTHER PUBLICATIONS

S. Arifin, et al., "A Novel Video Parsing Algorithm Utilizing the Pleasure-Arousal-Dominance Emotional Information", Image Processing 2007. ICIP 2007. IEEE International Conference on, IEEE, PI, pp. VI-333-VI-336, Sep. 1, 2007.

M. Xu, et al., "Affective Content Detection in Sitcom Using Subtitle and Audio", Multi-Media Modelling Conference Proceedings, 2006 12th International, Beijing, China, pp. 129-134, Jan. 4, 2006.

Hanjalic, A., "Extracting moods from pictures and sounds: towards truly personalized TV", IEEE Signal Processing Magazine, vol. 23, No. 2, Mar. 1, 2006.

PCT Search Report & Written Opinion, Re: Application #PCT/2013/027012, dated Apr. 22, 2013.

S. Zhao, et al., "Analyzing Twitter for Social TV: Sentiment Extraction for Sports", Proceedings of the 2nd International Workshop on Future of Television (FutureTV—2011), Lisbon, Portugal, Jun. 29-Jul. 1, 2011.

S. Zhang, et al., "Utilizing Affective Analysis for Efficient Movie Browsing", Image Processing (ICIP), 2009 16th IEEE International Conference on, IEEE, pp. 1853-1856, Nov. 7, 2009.

T. Fan, et al., "Sentiment-Oriented Contextual Advertising", Knowledge and Information Systems; An International Journal, Springer-Verlag, Lo, vol. 23, No. 3, pp. 321-344, Jun. 25, 2009.

* cited by examiner

| 400 | Receive a sentiment map for a segment of a media content item, the map including a sentiment-state keyword and a delimitation of the segment. |

| 402 | Evaluate the delimited segment in light of the sentiment map and of an advertisement. |

| 404a | If a result of the evaluation is favorable, then associate the advertisement with the delimited segment and direct the offered media content for display on a user's companion device. |

| 404b | Optionally send to a provider of the media content item a bid for associating the advertisement with the delimited segment and receive a response. |

| 406 | Optionally receive an updated sentiment map for the delimited segment; re-evaluate the delimited segment; and, if a result of the re-evaluation is less favorable than the original evaluation, request a refund for the bid. |

FIG. 4

SENTIMENT MAPPING IN A MEDIA CONTENT ITEM

CROSS-REFERENCE TO RELATED APPLICATIONS

The present application is related to U.S. patent application Ser. Nos. 13/419,576 and 13/419,615, filed on an even date herewith.

FIELD OF THE INVENTION

The present invention is related generally to electronic media and, more particularly, to evaluating sentiments in electronic media.

BACKGROUND OF THE INVENTION

Recently, advertisers have begun to look beyond "traditional" media (e.g., magazines and television) and have begun looking to "new media" (e.g., online and mobile services) to increase the effectiveness of their advertising campaigns. Online advertising is appealing because an advertiser can put an advertisement in front of an audience that is actively searching for information. This allows the advertiser to tap into the needs of people prepared to buy rather than, as in the traditional approach, blindly sending advertisements to people who are simply watching television or reading a print medium.

However, even as people spend more time online, traditional media remain very important (and they still receive the majority of advertising dollars). Indeed, rather than simply replacing traditional media time with online time, many people are beginning to combine traditional and new media. For example, while they watch television, they also pay attention to a "companion device" (e.g., a laptop computer or a smart phone). These users then receive programming (which can include advertising) both through the television and through the companion device.

These media are very different and the programming (which, again, can include advertising) delivered through them can be very different. This can cause conflicts when, for example, a user, while watching a very romantic movie, receives a funny advertisement on his companion device. The advertisement may, in itself, be unobjectionable to the user, but the conflicting sentiments between the movie and the advertisement confuses the user and may lead to "advertising dissonance." The dissonance reduces both the user's enjoyment of the movie and the advertisement's effectiveness for this user.

BRIEF SUMMARY

The above considerations, and others, are addressed by the present invention, which can be understood by referring to the specification, drawings, and claims. According to aspects of the present invention, a media content item (e.g., a movie, television program, or audio segment) is evaluated for its "sentiment states." That is, segments of the content item are determined to be, for example, "happy," "exciting," "sad," "funny," and the like. To assign sentiments, any information about the media clip may be evaluated such as the video and audio of the clip, metadata concerning the clip (e.g., close-captioning information and a description in an electronic program guide), and even social-networking responses to the content item. A "sentiment map" is created that delimits segments of the content item and contains the sentiment-state keywords associated with the segments.

In some embodiments, the delimitation of segments is based on the sentiment evaluation itself. Some embodiments also allow the delimiting and evaluating to be performed in real time (that is, while the media content item is being received), which can be important when social responses are included in the evaluation.

In addition to the delimitations and sentiment keywords, some embodiments include in the sentiment map an amplitude for each assigned sentiment keyword (e.g., how funny was it?) and a confidence value for the segment delimitation and for each keyword.

In some situations, multiple keywords are assigned to the same segment. Segments may overlap, and a segment may encompass the entire media content item. (This can be useful when the content item is very short.)

The evaluation, in some embodiments, considers information (e.g., profile and demographics) about a user actually watching the media content item. In this situation, an attempt is made to create a sentiment map personalized to this user's preferences. For example, a personalized sentiment map may tag a segment of a content item as exciting because this particular user is known to be an enthusiast for dog shows. The same segment is not tagged as exciting in a non-personalized sentiment map if the general public does not share this enthusiasm.

The sentiment map thus created can be used in a number of applications. As a first example, the map is considered by an advertisement broker. The broker uses the map to match his advertisement offerings with segments of the media content item and can thus place appropriate advertisements at times when they would be most favorably received. The advertising campaign may be directed to a primary device (on which a user is viewing the media content item) or to a companion device associated with the same user. In some embodiments, advertisement brokers can submit bids to have their advertising placed during advantageous times. A particularly sophisticated system could re-evaluate the content item after a bid was accepted, the re-evaluation based on additional information that just became available (e.g., social responses to a live broadcast). If the re-evaluation shows that the original evaluation, on which the bid was based, was not very accurate, given the additional information, a refund of a portion of the bid could be provided to the advertisement broker.

As a second example of an application that uses the sentiment map, a recommender system can consider the sentiment map of a media content item that was enjoyed by a user. By comparing this sentiment map with sentiment maps of other content items, the recommender can choose a content item whose sentiment map is similar to the sentiment map of the content item enjoyed by the user. (When comparing, the recommender can also consult a preference profile for the user). The recommender then recommends this other content item to the user.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 4 is a flowchart of an exemplary method for using a sentiment map to place advertisements.

DETAILED DESCRIPTION

Figure 1:
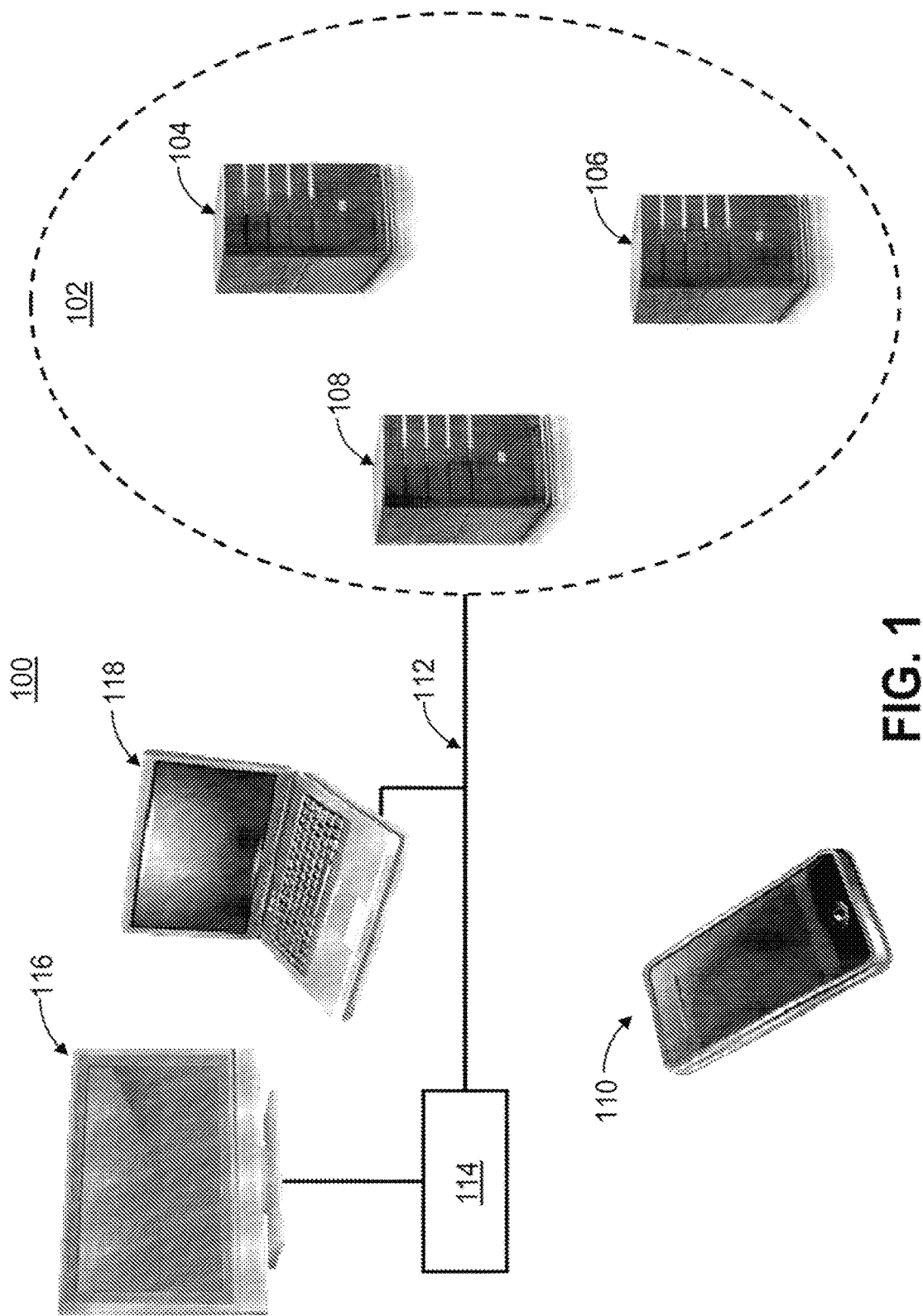
FIG. 1 is an overview of an exemplary environment in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

Aspects of the present invention may be practiced in the representative communications environment 100 of FIG. 1. Connected together via any or all of various known networking technologies 102 are media content providers (e.g., cable television head-end servers and the like) and other servers such as media analyzers 104, advertisement brokers 106, and recommender systems 108. (The functions of these servers are discussed below.) For ease of illustration, only one of each type of server 104, 106, 108 is shown, but multiples of each can exist and can work together, as discussed below.

The servers 104, 106, 108 provide, via the networking technologies 102, sentiment analysis of media content and related services to end-user devices. Traditional end-user devices are supported by "wireline" network technologies (e.g., fiber, wire, and cable) 112. For example, a set-top box 114 generally receives television programming from various media content providers and provides a user interface (e.g., an interactive program guide) for selecting and viewing content from the cable provider. A digital video recorder (not shown) can store programming for later viewing. Video content may be viewed on a television monitor 116. In some situations, a laptop computer 118 can access both television content and web-based services either wirelessly or via the wireline network 112. A home gateway, kiosk, digital sign, or media-restreaming device (not shown) are other possible end-user devices.

(A media-restreaming device transfers content between disparate types of networks. For example, it receives content from a cable television system 112 and then transmits that content over a local radio link such as WiFi to the cellular telephone 110. The media-restreaming device usually operates in both directions to carry messages between the networks. In some embodiments, aspects of the present invention are practiced by a media-restreaming device.)

Television programming can also be delivered to non-traditional subscriber devices such as the cellular telephone 110. This telephone 110 communicates wirelessly to a wireless base station (not shown but known in the art) to access the public switched telephone network, the Internet, or other networks to access web-based services as well as the television-delivery services provided by the media content providers.

Wireless and wireline network technologies generally support two-way traffic: Media content and related information are delivered to the end-user devices 110, 114, 116, 118, and requests go "up" to the servers 104, 106, 108.

A typical user may split his attention by interacting with any or all of the end-user devices 110, 114, 116, 118 at roughly the same time or in a temporally overlapping manner. Examples in the present discussion usually assume that the user is watching the television monitor 116 and possibly interacting with it through the set-top box 114. In some situations, the user at least occasionally gives some of his attention to a "companion device" such as the cellular telephone 110.

To illustrate aspects of the present invention, consider a user watching a television program on the television monitor 116. A media analysis application analyzes the television program (possibly before the program is delivered to the user or possibly in real time) for sentiments. The media analysis application produces a sentiment map of the television program. The map lists segments of the program along with sentiments (e.g., "happy," "exciting," unknown) associated with the segments. (For the sake of simplicity, the present discussion assumes that the media analysis application is fully embodied on one device, but in other embodiments this application can reside at least partially within the head-end of a cable provider, on a web server 104, on an end-user device such as the cellular telephone 110 or set-top box 114, or on some combination of these.)

In some embodiments, the sentiment map is then made available to services such as an advertisement broker 106. By reviewing the sentiment map, the advertisement broker 106, determines, for example, that the next 30 seconds of the television program are "exciting." The advertisement broker 106 finds an advertisement whose sponsor wishes the advertisement to be associated with "exciting" content. The advertisement broker 106 then places a bid to place that advertisement either on the television monitor 116 or on the user's companion device 110. If the bid is accepted, then the advertisement is placed temporally near the exciting segment of the television program, to the satisfaction of the advertisement sponsor. (In some situations, the advertisement is delivered to the set-top box 114, and the set-top box 114 delivers the advertisement to the television monitor 116. These sorts of connection options are well known in the art and need not be further discussed.)

Particular aspects of the media analysis application are discussed below in conjunction with FIG. 3. Two examples of applications that use the sentiment map are discussed below in conjunction with FIGS. 4 and 5.

Figure 2:
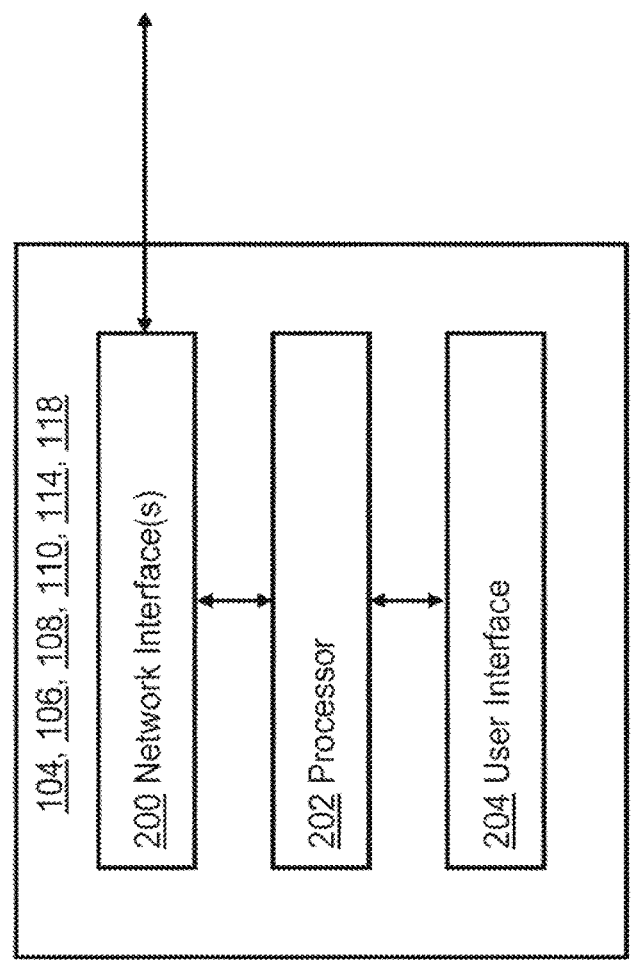
FIG. 2 is a generalized schematic of some of the devices shown in FIG. 1.
Figure 5:
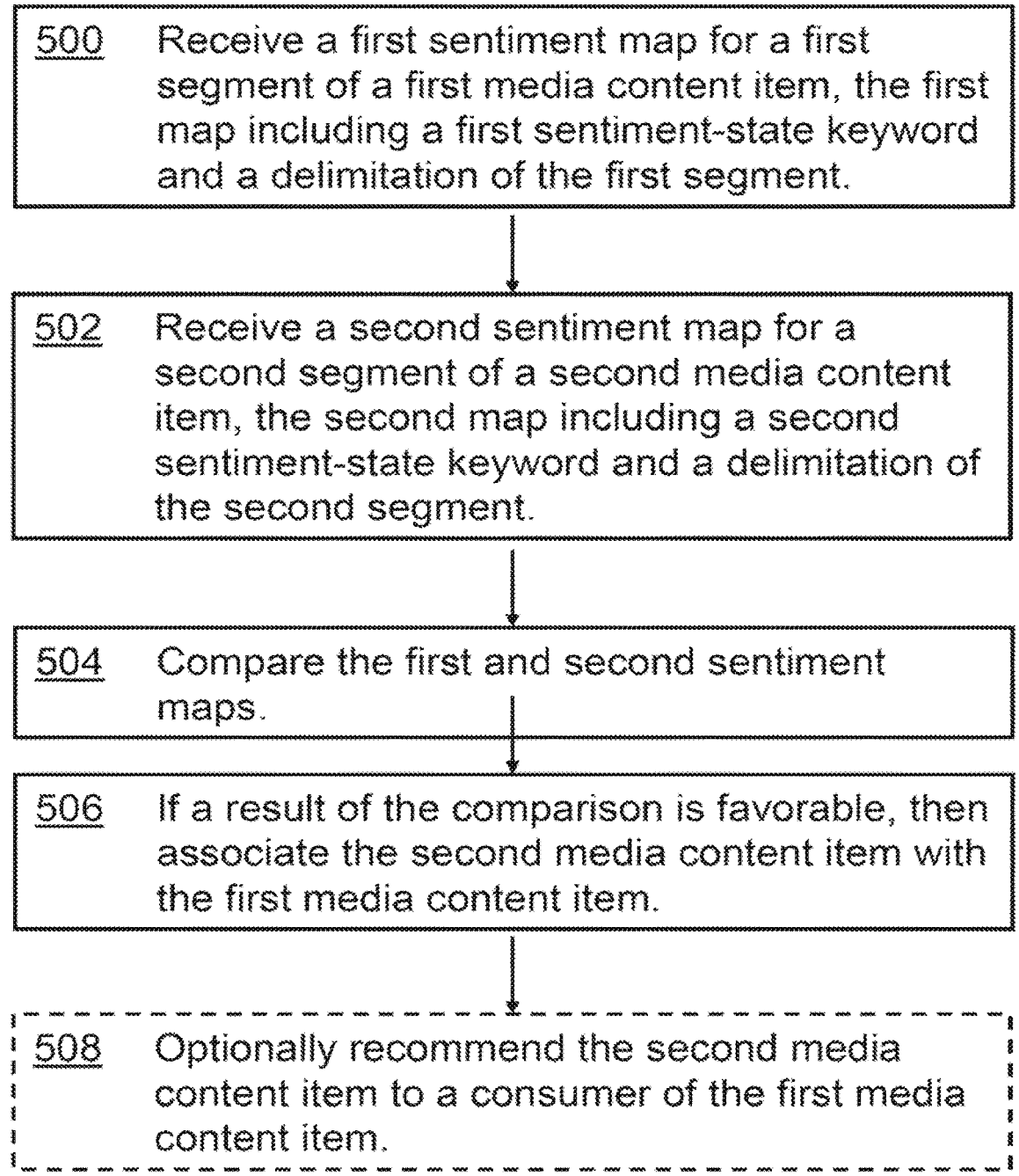
FIG. 5 is a flowchart of an exemplary method for using a sentiment map to recommend a media content item.

FIG. 2 shows the major components of a representative server 104, 106, 108 or end-user device 110, 114, 118. Network interfaces (also called transceivers) 200 send and receive media presentations and messages such as the sentiment map. A processor 202 controls the operations of the device and, in particular, supports aspects of the present invention as illustrated in FIGS. 3 through 5, discussed below. The user interface 204 supports a user's (or administrator's) interactions with the device. Specific uses of these components by specific devices are discussed as appropriate below.

Figure 3:
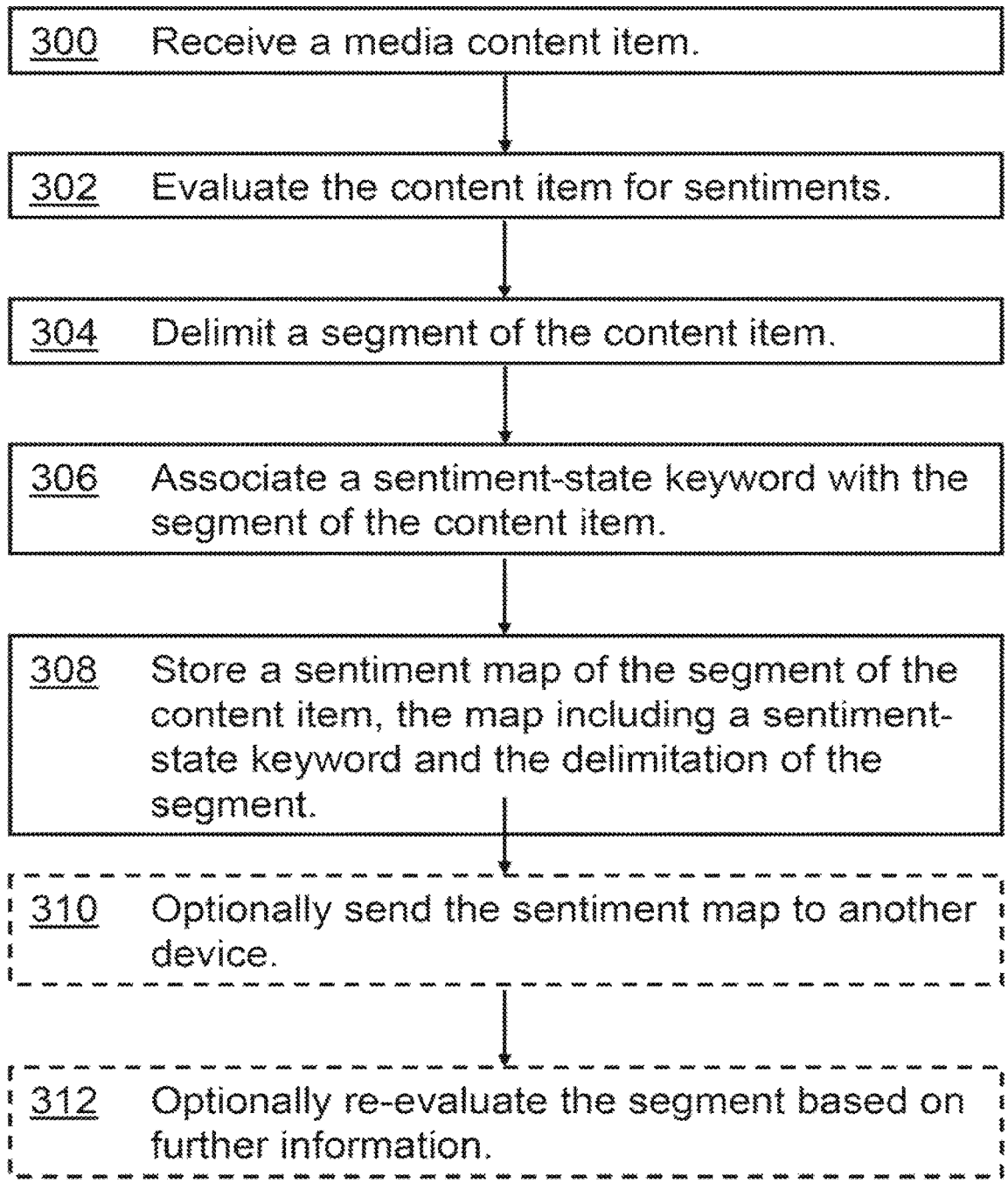
FIG. 3 is a flowchart of an exemplary method for creating a sentiment map for a media content item.

FIG. 3 presents a method for creating a sentiment map. The method begins in step 300 when the media analyzer application receives a media content item. First note that "media content item" is meant very broadly: It can be a television program or movie, but it could also be a sound-only clip, a message of any kind (e.g., an e-mail with attached or embedded content), a telephone call with or without accompanying video, or even an advertisement or an interactive computer game. For simplicity's sake, the following discussion often assumes that the media content item is a television program presented on the television monitor 116, but all these other possibilities should be kept in mind.

"Receiving" encompasses many possibilities. If the media analyzer is embodied on a network server 104, then it can download the full content item and process it according to the remaining steps in FIG. 3. This "offline" method has several advantages. First, the media analyzer 104 can take whatever time it needs to perform the analysis. Second, because the media analyzer 104 can review the entire content item, it can better estimate the beginning and end of a particular segment. (See the detailed description of delimitation that accompanies step 304 below.) Third, a network server 104 can perform the sentiment analysis once for a given content item and then provide the map as needed, rather than having each recipient of the content item perform its own analysis. Most of these advantages also apply if the analysis is done offline by a local user device, e.g., by the user's laptop computer 118 analyzing a content item stored on the user's digital video recorder.

There are cases, however, where offline processing is simply not an option. This is especially true when the media analyzer cannot acquire access to the full media content item significantly before the sentiment map is required. The content item may be a live event streamed to a user's television monitor 116. Even if the content item is not actually a live broadcast, if it is being shown for the first time (e.g., the newest episode of a television series), then it is unlikely that the media analyzer will be allowed access to all of the content item before it is sent to users. In these situations, the media analyzer attempts to create the sentiment map in "real time," that is, while the content item is being received. In terms of FIG. 3, this means that steps 300 through 308 (and possibly even steps 310 and 312) are performed, in some sense, concurrently rather than consecutively. In one embodiment, the media analyzer application runs on the user's set-top box 114, and it analyzes the programming as it is being received from the cable system 112 and then sent to the television monitor 116. In some embodiments, the programming can be buffered and delayed for a few seconds by the set-top box 114 to allow the media analysis to "keep ahead" of the point in the content item currently being viewed.

The next two steps, 302 and 304, are, in most embodiments, inseparable. The present discussion attempts, as far as possible, to present these two steps independently, but it should be kept in mind that the detailed discussion of each step informs that of the other.

In step 302, the media content item is analyzed for sentiments. Ideally, every point in time of the content item is associated with one or more sentiment-state keywords that express the mood of the content item at that point in time. (See also the discussion of step 306 below.) Step 304 is a recognition that, generally, the "point in time" is actually a relatively short temporal segment of the content item. For example, the segment from 20 seconds into the content item to 30 seconds is considered to be "happy," and the segment from 53 seconds to 1 minute, 20 seconds is "exciting." Clearly, the sentiments associated with a segment and the delimitation of the segment are interrelated. In fact, it is usually the sentiment analysis itself that determines the delimitation of the segments. That is, when the sentiment "happy" is found at one time, the surrounding time in the content item can be analyzed to determine the approximate temporal extent of this happiness. That temporal extent then defines the limits of the segment that is associated with happiness. Sometimes, metadata are available with the content item that help in delimiting the segments (e.g., a scene list with start and stop times).

Focusing again on step 302, many inputs may be used by the media analyzer application. Soundtracks generally provide distinct cues to viewers to know what sentiment is expected (e.g., a low, slow cadence in a minor key is usually associated with sorrow or loss by human hearers), and well known tools are available to the media analyzer to extract this information. The words being said, and how they are said, also often contain clear sentiment cues.

Similarly, the video itself may contain cues, such as the amount of time between cuts (exciting scenes usually cut very often), light levels, the amount of shadowing of a speaker's face, and how the main characters are placed with respect to one another.

In some situations, the media analysis application can use metadata associated with the media content item such as close-captioning information, an electronic program guide listing, or a script with staging instructions.

A sophisticated media analysis application can mine further sources of information. One intriguing possibility considers "social-networking" metadata, that is, online posts and commentary produced by viewers of the media content item. These comments are often produced while the content item is being viewed. Other comments are posted later. All of these comments can be reviewed in an attempt to refine the sentiment analysis. Consider a case where the analysis application reviews the video and audio of a segment and, based on that review, associates an "exciting" keyword with that segment. However, a scan of online posts reveals a surprising number of viewers who found this same segment to be poorly conceived and woodenly acted. These viewers were disappointed and bored with the segment. The analysis application can take these reviews into account by downgrading a confidence value (see the discussion of step 306 below) associated with the "exciting" keyword or even by assigning both an "exciting" keyword and a "boring" keyword to the same segment, the former indicating the director's intent, and the latter indicating the result actually achieved.

Some embodiments use further sources of information during the evaluation. The media analysis application can attempt to map a particular user's expected response to segments of the media content item. (This is very specific as compared to the above discussion of online posts, where the posts reflect the responses of the general population to a segment.) Here, the information specific to a particular user can include, for example, a preference profile of the user, purchasing and other behavioral information, demographic information, and even current situational information such as the presence of friends and family during the viewing of the content item. All of this information can be considered when making a sentiment map personalized to this user. In the example mentioned in the Summary, the personalized sentiment map may tag a segment as "exciting" because this particular user is known to be an enthusiast for dog shows. The same segment may not be not tagged as exciting in a non-personalized sentiment map if the general public does not share this enthusiasm.

Moving now to step 304, in some situations the entire media content item is made up of only one segment. If, for example, the content item is very short, such as a 30-second advertisement, then it may present only one sentiment state throughout. Generally, however, several segments can be defined within one content item. The segments may even overlap as, for example, when, partway through a "happy" segment, an "exciting" segment begins.

The delimitation produced by the media analysis application is often imprecise. To address this possibility, sophisticated embodiments attach to each delimitation a confidence value. For example: "It is 90% probable that this happy segment lasts for at least the next 20 seconds, and 65% probable that it continues for a further 15 seconds after that."

It should be noted that, in many situations, the delimited segments do not encompass the entire content item. Some portions of the content item may simply not express a sentiment, or the media analysis application cannot discover the particular sentiment intended.

In step 306, one or more sentiment-state keywords are associated with delimited segments. Any types of keywords can be used here including, for example, "happy," "sad," "exciting," "boring," "funny," "romantic," "violent," "successful," and the like. (As noted just above, the media analysis application may not be able to associate any sentiment-state keyword with a particular segment. In some embodiments, the keyword "unknown" is then used.) As the tools available to the media analysis application improve, it is expected that the list of keywords will increase.

Some applications that use the sentiment map (see in particular the discussion accompanying FIGS. 4 and 5 below) are interested in knowing not only the sentiments associated with a segment, but the amplitudes of those sentiments, that is, not only "this segment is funny," but also "this segment is very, very funny" or "this is the funniest segment in the entire media content item." The sentiment map can include confidence values for each associated sentiment keyword and the amplitude (if any) of the keywords.

Step 308 stores the information generated by the evaluation and delimitation in a sentiment map. Any number of types of data representation are possible here. It should be noted that overall, the map is very much smaller than the media content item itself. The map can be sent to applications that need it (step 310). (See the discussion of example applications accompanying FIGS. 4 and 5 below.) If the map is needed in real time, then parts of it can be sent out to waiting applications as they become available (e.g., segment by segment).

In optional step 312, the sentiment mapping of a segment is revised based on further information, presumably information that was not available when the original sentiment map was created for the segment. The online social-network posts, mentioned above in relation to step 302, are especially relevant here. Because some applications may need to use the sentiment map in real time (FIG. 4 gives an example), the media analyzer produces an initial sentiment map as quickly as it can with whatever information is at hand. Some online comments may be posted too late to be considered for this real-time analysis, but they can be used in the re-evaluation of step 312.

Portions of the media content item itself may also count as "further information" for the purposes of step 312. As mentioned above in the discussion of offline vs. real-time processing in relation to step 300, offline processing has the advantage that it can view the entire media content item when deciding how to delimit each segment. A real-time media analyzer does not have that option, but, after receiving more or even all of the content item, it can achieve much of the results of offline processing by re-considering the delimitation of segments as a result of the re-evaluation of step 312.

Many types of applications can make use of the sentiment map. For example, the producer or provider of the media content item can review the map (especially when online posts are considered when making the map) to compare the director's intent with the actual effect achieved by the content item. FIGS. 4 and 5 present two other possibilities.

FIG. 4 presents a method whereby an advertisement broker 106 uses the sentiment map when deciding where to place advertisements. The method begins in step 400 when the advertisement broker 106 receives the sentiment map. As discussed above, this may be a map of the entire media content item, produced offline by, say, a media analysis server 104. Also of interest is the case where the advertisement broker 106 receives the map segment by segment as produced in real time, as, for example, the content item is being distributed to viewers via the cable television system 112.

In any case, the advertisement broker 106 in step 402 compares the sentiment keywords and delimitation of a segment with a candidate advertisement. For example, the sponsor of this particular advertisement may have told the advertisement broker 106 that this advertisement should be shown in conjunction with "exciting" segments of the media content item.

In another case, the sponsor did not so inform the advertisement broker 106 of its intent. Instead, a sentiment map is created for the advertisement itself (as noted above in relation to step 304, this map may only contain a single segment). That is, it is recognized that an advertisement is also a media content item in its own right and can be subjected to the same type of analysis described above in reference to FIG. 3. In this case, the analysis may show that the advertisement is both "exciting" and "upbeat." The advertisement broker 106 can then infer that this advertisement would be best received if it were shown during "exciting" or "upbeat" segments of the media content item that the user is watching on his television monitor 116.

Regardless of how the advertisement broker 106 determines which sentiments are most favorable to this advertisement, the advertisement is compared against the sentiment map. The comparison may also consider the amplitude of the sentiment and the delimitation of the segment (i.e., the segment may be too short to use with this advertisement). Confidence values in the map can also be considered: If the content item is drawing to a close, and if the advertisement broker 106 is tasked with presenting a given number of advertisements during the presentation of the content item, then the advertisement broker 106 may have to settle for a less than ideal, or for a less confidently ideal, segment for the advertisement. If a match is favorable enough (usually as defined by the advertisement sponsor or as inferred by the advertisement broker 106), then the advertisement broker 106 proceeds to step 404a where it attempts to place this advertisement in conjunction with this segment Several implementations are possible for "attempting to place" the advertisement. In the example of step 404b, the advertisement broker 106 submits a bid to place the advertisement at a given time. The bid can include a proposed fee to be paid to the content provider, and can specify whether the advertisement is to be placed within the stream of the media content item itself (as viewed on the television monitor 116 to continue the pervasive example of this discussion) or on a companion device, such as the user's cellular telephone 110. Of course, if the latter is desired, then well known methods can be applied to determine whether or not the user has a companion device, whether or not that device is turned on, and whether or not the user is interacting with that device (indicating that the companion device has captured at least some of the user's attention). If the bid is accepted, then the advertisement is placed accordingly.

In step 312 of FIG. 3, the sentiment map is redrawn as more information becomes available to the media analysis application. In optional step 406 of FIG. 4, the advertisement broker 106 reviews the revised map. If a bid was placed and accepted, but the revised map shows that the segment was not all it was thought to be (e.g., based on viewer's online responses, a supposedly "romantic" scene fell flat), then the advertisement broker 106 can request a refund of part of the bid price. The possibility of a refund could make advertisement brokers 106 more willing to place a reasonable amount of reliance on sentiment mapping and on placing bids based on these maps.

FIG. 5 presents a recommender system 108 that uses sentiment maps. In steps 500 and 502, the recommender 108 receives sentiment maps of two media content items. The maps are compared in step 504, and, if the comparison is favorable in some sense, then the two content items are associated with one another in step 506. (This is a generalization of the special case discussed above in relation to step 402 of FIG. 4 where a sentiment map of an advertisement is compared against the map of a content item to see where the advertisement should be placed.) Generally, this means that the two content items have similar sentiment maps. For example, two classic "tear jerkers," though very different in plot and staging, may exhibit a similar progression of sentiments. (This is one reason, in fact, that such movies are called "formulaic:" The formula generally refers to the sentiments evoked scene by scene in addition to, or instead of, the plot elements.) Thus sentiment maps can be used to categorize content items in a more meaningful fashion than categorization by actors, setting, or plot elements. If a user is known to like one content item, then a second content item with a similar sentiment map can be recommended to him in step 508. The user's reaction to the recommendation may help to improve the quality of the sentiment mapping.

In view of the many possible embodiments to which the principles of the present invention may be applied, it should be recognized that the embodiments described herein with respect to the drawing figures are meant to be illustrative only and should not be taken as limiting the scope of the invention. For example, many other sentiment keywords are possible, and other applications of sentiment mapping can be considered. Therefore, the invention as described herein contemplates all such embodiments as may come within the scope of the following claims and equivalents thereof.

We claim:

1. A method for associating media content items, the method comprising:
   receiving, by an advertisement broker device comprising at least one processor, a first sentiment map mapping delimited segments of a media content item to at least one media content-related sentiment-state keyword, wherein the at least one media content-related sentiment-state keyword has at least one temporal delimitation within said media content item and is mapped to one or more delimited segments based on an overlap with a temporal delimitation of each of the delimited segments within said media content item,
   scanning a user's social networking information for personalizing said first sentiment map per user, wherein said first sentiment map is personalized for a user with the at least one media content-related sentiment-state keyword mapped to a respective delimited segment based on the user's social networking information, said media content-related sentiment-state keyword capturing a mood personalized to the user for at least a temporal extent of overlapping temporal delimitations between the media content-related sentiment-state keyword and respective delimited segment;
   evaluating, by the advertisement broker device, one or more media content-related sentiment-state keywords for a delimited segment of interest and comparing it to a second sentiment map mapping an offered media content item comprising an advertisement offering to at least one advertisement-related sentiment-state keyword, the at least one advertisement-related second sentiment map comprising a sentiment-state keyword associated with the offered media content item and a temporal delimitation of the offered media content item;
   if a result of the evaluating is a favorable result between a first media content-related sentiment-state keyword from the first sentiment map and a first advertisement-related sentiment-state keyword from the second sentiment map, identifying a temporal extent associated with the temporal delimitations of the delimited segment of interest and the offered media content item related to the first advertisement-related sentiment-state keyword and associating, by the advertisement broker device, the offered media content item with the delimited segment,
   directing the offered media content item for display on a user's companion device for playback linearly with said delimited segment displayed on a user's primary device.

2. The method of claim 1 wherein the first media content item is selected from a group consisting of: a movie, a television program, a radio program, a segment of video, a segment of audio, a song, a music video, a personal message, a public-service message, a service alert, a health-service recommendation, a web page, an e-mail message, and a telephone call.

3. The method of claim 1 wherein the advertisement broker device is selected from a group consisting of: a set-top box, a personal communications device, a mobile telephone, a personal digital assistant, a personal computer, a tablet computer, a gaming console, a head-end server, a server, and a plurality of servers.

4. The method of claim 1 wherein the delimited segment comprises an entirety of the first media content item.

5. The method of claim 1 wherein the first and/or second sentiment map further comprises a confidence value associated with the first temporal delimitation of the delimited segment.

6. The method of claim 1:
   wherein receiving comprises receiving sentiment maps of a plurality of delimited segments of the first media content item; and
   wherein at least two delimited segments of the plurality of delimited segments of a first media content item overlap.

7. The method of claim 1 wherein the sentiment-state keyword is selected from a group consisting of: happy, sad, funny, successful, romantic, exciting, violent, and unknown.

8. The method of claim 1 wherein the first and/or second sentiment map comprises an amplitude value associated with the sentiment-state keyword.

9. The method of claim 1 wherein the first and/or second sentiment map comprises a keyword confidence value associated with the sentiment-state keyword.

10. The method of claim 1 wherein the first and/or second sentiment map comprises a plurality of sentiment-state keywords associated with the delimited segment.

11. The method of claim 1 wherein associating comprises:
sending, by the processor of the advertisement broker device to a provider of the first media content item, a bid for associating the offered media content item with the delimited segment; and
receiving, by the processor of the advertisement broker device from the first media content item provider, an acknowledgement that the bid was accepted.

12. The method of claim 11:
wherein a user consumes the first media content item on a primary content-consumption device;
wherein the user is associated with a secondary content-consumption device distinct from the primary content-consumption device; and
wherein the bid specifies whether the offered media content item is to appear on the primary content-consumption device or is to appear on the secondary content-consumption device.

13. The method of claim 11:
wherein the bid specifies an amount to be paid to the first media content item provider if the bid is accepted.

14. The method of claim 13 further comprising:
receiving, by the processor of the advertisement broker device, an updated sentiment map of the delimited segment of the first media content item;
re-evaluating, by the processor of the advertisement broker device, the delimited segment in light of a new comparison of the updated sentiment map and the second sentiment map of the offered media content item; and
if the re-evaluating shows a diminished level of favorability, then requesting, by the processor of the advertisement broker device of the first media content item provider, a refund of at least a portion of an amount paid.

15. An advertisement broker device for associating an offered media content item with a first media content item, the advertisement broker device comprising:
a network interface configured for receiving a first sentiment map mapping delimited segments of the media content item to at least one media content-related sentiment-state keyword, wherein the at least one media content-related sentiment-state keyword has at least one temporal delimitation within said media content item and is mapped to one or more delimited segments based on an overlap with a temporal delimitation of each of the delimited segments within said media content item; and
a processor operatively connected to the network interface, the processor configured for:
scanning a user's social networking information for personalizing said first sentiment map per user, wherein said first sentiment map is personalized for a user with the at least one media content-related sentiment-state keyword mapped to a respective delimited segment based on a user's social networking information, said media content-related sentiment-state keyword capturing a mood personalized to the user for at least a temporal extent of overlapping temporal delimitations between the media content-related sentiment-state keyword and respective delimited segment;
evaluating one or more media content-related sentiment-state keywords for a delimited segment of interest and comparing it to a second sentiment map mapping an offered media content item comprising an advertisement offering to at least one advertisement-related sentiment-state keyword, the at least one advertisement-related second sentiment map comprising a sentiment-state keyword associated with the offered media content item and a temporal delimitation of the offered media content item;
if a result of the evaluating is a favorable result between a first media content-related sentiment-state keyword from the first sentiment map and a first advertisement-related sentiment-state keyword from the second sentiment map, identifying a temporal extent associated with the temporal delimitations of the delimited segment of interest and the offered media content item related to the first advertisement-related sentiment-state keyword and associating the offered media content item with the delimited segment,
directing the offered media content item for display on a user's companion device for playback linearly with said delimited segment displayed on a user's primary device.

* * * * *